(12) United States Patent
Blackwell et al.

(10) Patent No.: US 7,070,743 B2
(45) Date of Patent: Jul. 4, 2006

(54) INDUCTION-HEATED REACTORS FOR GAS PHASE CATALYZED REACTIONS

(75) Inventors: Benny E. Blackwell, Newark, DE (US); Cynthia K. Fallon, Hockessin, DE (US); Gregory S. Kirby, Avondale, PA (US); Mehrdad Mehdizadeh, Avondale, PA (US); Theodore Augur Koch, Wilmington, DE (US); Carmo Joseph Pereira, Silver Spring, MD (US); Sourav Kumar Sengupta, Wilmington, DE (US)

(73) Assignee: Invista North America S.A R.L., Wilmington, DE (US)

( * ) Notice: Subject to any disclaimer, the term of this patent is extended or adjusted under 35 U.S.C. 154(b) by 306 days.

(21) Appl. No.: 10/098,920

(22) Filed: Mar. 14, 2002

(65) Prior Publication Data

US 2003/0175196 A1    Sep. 18, 2003

(51) Int. Cl.
*B01J 8/02* (2006.01)
*B01J 12/00* (2006.01)
(52) U.S. Cl. ............... 422/186.01; 422/198; 422/199
(58) Field of Classification Search ........... 422/186.01, 422/198, 199
See application file for complete search history.

(56) References Cited

U.S. PATENT DOCUMENTS

| 1,986,348 | A | * | 1/1935 | Burritt et al. ............... 422/199 |
| 2,443,423 | A | | 6/1948 | Helmers |
| 3,948,645 | A | * | 4/1976 | Elvander et al. ........... 75/10.15 |
| 4,461,751 | A | | 7/1984 | Albano et al. |
| 4,506,131 | A | * | 3/1985 | Boehm et al. ............... 219/662 |
| 5,242,882 | A | * | 9/1993 | Campbell ................... 502/325 |
| 5,260,538 | A | * | 11/1993 | Clary et al. ................. 219/628 |
| 5,401,483 | A | * | 3/1995 | Ostroff ....................... 423/376 |
| 5,958,273 | A | | 9/1999 | Koch et al. |
| 6,287,531 | B1 | | 9/2001 | Riegert et al. |
| 6,315,972 | B1 | | 11/2001 | Mehdizadeh et al. |

FOREIGN PATENT DOCUMENTS

| GB | 2210286 | 6/1989 |
| WO | WO 9901212 A1 | 1/1999 |

OTHER PUBLICATIONS

Copy of The International Search Report, Application No. PCT/US 03/07356, filing date Mar. 11, 2003.

* cited by examiner

Primary Examiner—Christina Johnson

(57) ABSTRACT

Elevated temperature, gas-phase, catalyzed processes for preparing HCN in which induction heating is used as a source of energy, and novel apparatus for carrying out said processes.

4 Claims, 9 Drawing Sheets

INDUCTION-HEATED REACTORS FOR GAS PHASE CATALYZED REACTIONS

FIELD OF THE INVENTION

This invention relates to elevated temperature, gas phase, catalyzed processes for preparing HCN in which induction heating is used as a source of energy, and novel apparatus for carrying out said processes.

BACKGROUND OF THE INVENTION

Induction heating is a non-contact method of selectively heating electrically-conductive materials by applying an alternating magnetic field to induce an electric current, known as an eddy current, in the material, known as a susceptor, thereby heating the susceptor. Induction heating has been used in the metallurgical industry for many years for the purpose of heating metals, e.g. melting, refining, heat treating, welding, and soldering. Induction heating is practiced over a wide range of frequencies, from AC powerline frequencies as low as 50 Hz up to frequencies of tens of MHz.

At a given induction frequency the heating efficiency of the induction field increases when a longer conduction path is present in an object. Large solid work pieces may be heated with lower frequencies, while small objects require higher frequencies. For a given size object to be heated, too low a frequency provides inefficient heating since the energy in the induction field does not generate the desired intensity of eddy currents in the object. Too high a frequency, on the other hand, causes non-uniform heating since the energy in the induction field does not penetrate into the object and eddy currents are only induced at or near the surface. However, induction heating of gas-permeable metallic structures is not known in the prior art.

Prior art processes for gas phase catalytic reactions require that the catalyst have a high surface area in order for the reactant gas molecules to have maximum contact with the catalyst surface. The prior art processes typically use either a porous catalyst material or many small catalytic particles, suitably supported, to achieve the required surface area. These prior art processes rely on conduction, radiation or convection to provide the necessary heat to the catalyst. To achieve good selectivity of chemical reaction all portions of the reactants should experience uniform temperature and catalytic environment. For an endothermic reaction, the rate of heat delivery therefore needs to be as uniform as possible over the entire volume of the catalytic bed. Both conduction, and convection, as well as radiation, are inherently limited in their ability to provide the necessary rate and uniformity of heat delivery.

GB Patent 2210286 (GB '286), which is typical of the prior art, teaches mounting small catalyst particles that are not electrically conductive on a metallic support or doping the catalyst to render it electrically conductive. The metallic support or the doping material is induction heated and in turn heats the catalyst. This patent teaches the use of a ferromagnetic core passing centrally through the catalyst bed. The preferred material for the ferromagnetic core is silicon iron. Although useful for reactions up to about 600 degrees C., the apparatus of GB Patent 2210286 suffers from severe limitations at higher temperatures. The magnetic permeability of the ferromagnetic core would degrade significantly at higher temperatures. According to Erickson, C. J., "Handbook of Heating for Industry", pp 84–85, the magnetic permeability of iron starts to degrade at 600 C and is effectively gone by 750 C. Since, in the arrangement of GB '286, the magnetic field in the catalyst bed depends upon the magnetic permeability of the ferromagnetic core, such an arrangement would not effectively heat a catalyst to temperatures in excess of 750 C, let alone reach the greater than 1000 C required for the production of HCN.

The apparatus of GB Patent 2210286 is also believed chemically unsuitable for the preparation of HCN. HCN is made by reacting ammonia and a hydrocarbon gas. It is known that iron causes the decomposition of ammonia at elevated temperatures. It is believed that the iron present in the ferromagnetic core and in the catalyst support within the reaction chamber of GB '286 would cause decomposition of the ammonia and would inhibit, rather than promote, the desired reaction of ammonia with a hydrocarbon to form HCN.

Hydrogen cyanide (HCN) is an important chemical with many uses in the chemical and mining industries. For example, HCN is a raw material for the manufacture of adiponitrile, acetone cyanohydrin, sodium cyanide, and intermediates in the manufacture of pesticides, agricultural products, chelating agents, and animal feed. HCN is a highly toxic liquid which boils at 26 degrees C., and as such, is subject to stringent packaging and transportation regulations. In some applications, HCN is needed at remote locations distant from large scale HCN manufacturing facilities. Shipment of HCN to such locations involves major hazards. Production of the HCN at sites at which it is to be used would avoid hazards encountered in its transportation, storage, and handling. Small scale on-site production of HCN, using prior art processes, would not be economically feasible. However, small scale, as well as large scale, on-site production of HCN is technically and economically feasible using the processes and apparatus of the present invention.

HCN can be produced when compounds containing hydrogen, nitrogen, and carbon are brought together at high temperatures, with or without a catalyst. For example, HCN is typically made by the reaction of ammonia and a hydrocarbon, a reaction which is highly endothermic. The three commercial processes for making HCN are the Blausaure aus Methan und Ammoniak (BMA), the Andrussow, and the Shawinigan processes. These processes can be distinguished by the method of heat generation and transfer, and by whether a catalyst is employed.

The Andrussow process uses the heat generated by combustion of a hydrocarbon gas and oxygen within the reactor volume to provide the heat of reaction. The BMA process uses the heat generated by an external combustion process to heat the outer surface of the reactor walls, which in turn heats the inner surface of the reactor walls and thus provides the heat of reaction. The Shawinigan process uses an electric current flowing through electrodes in a fluidized bed to provide the heat of reaction.

In the Andrussow process, a mixture of natural gas (a hydrocarbon gas mixture high in methane), ammonia, and oxygen or air are reacted in the presence of a platinum catalyst. The catalyst typically comprises a number of layers of platinum/rhodium wire gauze. The quantity of oxygen is such that the partial combustion of the reactants provides sufficient energy to preheat the reactants to an operating temperature in excess of 1000° C. as well as the required heat of reaction for HCN formation. The reaction products are HCN, $H_2$, $H_2O$, CO, $CO_2$, and trace amounts of higher nitrites, which must then be separated.

In the BMA process, a mixture of ammonia and methane flows inside non-porous ceramic tubes made of a high temperature refractory material. The inside of each tube is lined or coated with platinum particles. The tubes are placed in a high temperature furnace and externally heated. The heat is conducted through the ceramic wall to the catalyst surface, which is an integral part of the wall. The reaction is typically carried out at 1300° C. as the reactants contact the catalyst. The heat flux required is high due to the elevated reaction temperature, the large heat of reaction, and the fact that coking of the catalyst surface can occur below the reaction temperature, which deactivates the catalyst. Since each tube is typically about 1" in diameter, a large number of tubes are needed to meet production requirements. Reaction products are HCN and hydrogen.

In the Shawinigan process, the energy required for reaction of a mixture consisting of propane and ammonia is provided by an electric current flowing between electrodes immersed in a fluidized bed of non-catalytic coke particles. The absence of a catalyst, as well as the absence of oxygen or air, in the Shawinigan process means that the reaction must be run at very high temperatures, typically in excess of 1500 degrees C. The higher temperatures required place even greater constraints on the materials of construction for the process.

While, as disclosed above, it is known that HCN can be produced by the reaction of $NH_3$ and a hydrocarbon gas, such as $CH_4$ or $C_3H_8$, in the presence of a Pt group metal catalyst, there is still a need to improve the efficiency of such processes, and related ones, so as to improve the economics of HCN production, especially for small scale production. It is particularly important to minimize energy use and ammonia breakthrough while maximizing the HCN production rate in comparison to the amount of precious metal catalyst used. Moreover, the catalyst should not detrimentally affect production of HCN by promoting undesirable reactions such as coking. Furthermore, it is desired to improve activity and life of catalysts used in this process. Significantly, a large part of the investment in production of HCN is in the platinum group catalyst. The present invention heats the catalyst directly, rather than indirectly as in the prior art, and thus accomplishes these desiderata.

As previously discussed, relatively low frequency induction heating is known to provide good uniformity of heat delivery at high power levels to objects that have relatively long electrical conduction paths. When providing the reaction energy to an endothermic gas phase catalytic reaction, the heat needs to be directly delivered to the catalyst with minimum energy loss. The requirements of uniform and efficient heat delivery to a high-surface-area, gas-permeable catalyst mass seem to conflict with the capabilities of induction heating. The present invention is based on unexpected results obtained with a reactor configuration wherein the catalyst has a novel structural form. This structural form combines the features of: 1) an effectively long electrical conduction path length, which facilitates efficient direct induction heating of the catalyst in a uniform manner, and 2) a catalyst having a high surface area; these features cooperate to facilitate endothermic chemical reactions. The complete lack of iron in the reaction chamber facilitates the production of HCN by the reaction of $NH_3$ and a hydrocarbon gas.

SUMMARY OF THE INVENTION

This invention relates to an apparatus, a catalyst arrangement, referred to hereinafter as a "catalyst/susceptor", and a process for preparing HCN by reacting ammonia and a lower alkane in the gas phase in the presence of a platinum group metal catalyst. In accordance with the invention, the catalyst/susceptor, comprised of one or more platinum group metals in the form of a gas-permeable cylinder, performs the dual function of being a susceptor for induction heating and serving as a catalyst for preparation of HCN. Thus the catalyst/susceptor is heated by induction heating, whereby the heated catalyst provides the reactants with the heat necessary for the production of HCN. The cylindrical catalyst/susceptor may be comprised of a gas-permeable solid, such as a porous foam, or may be comprised of multiple layers of a gas-permeable filamentary structure. Not only does the catalyst/susceptor of the present invention possess catalytic activity, but it possesses the characteristics of having an electrical conduction path long enough to be inductively heated at lower frequency while, and at the same time, having a sufficient surface area per reactor volume. By relying on inductive heating of the catalyst, rather than the prior art processes which heat the reaction vessel or a portion thereof or the like and thereby heat the catalyst by conduction, radiation and/or convection, considerable advantages are realized.

DETAILED DESCRIPTION OF THE INVENTION

Figure 1:
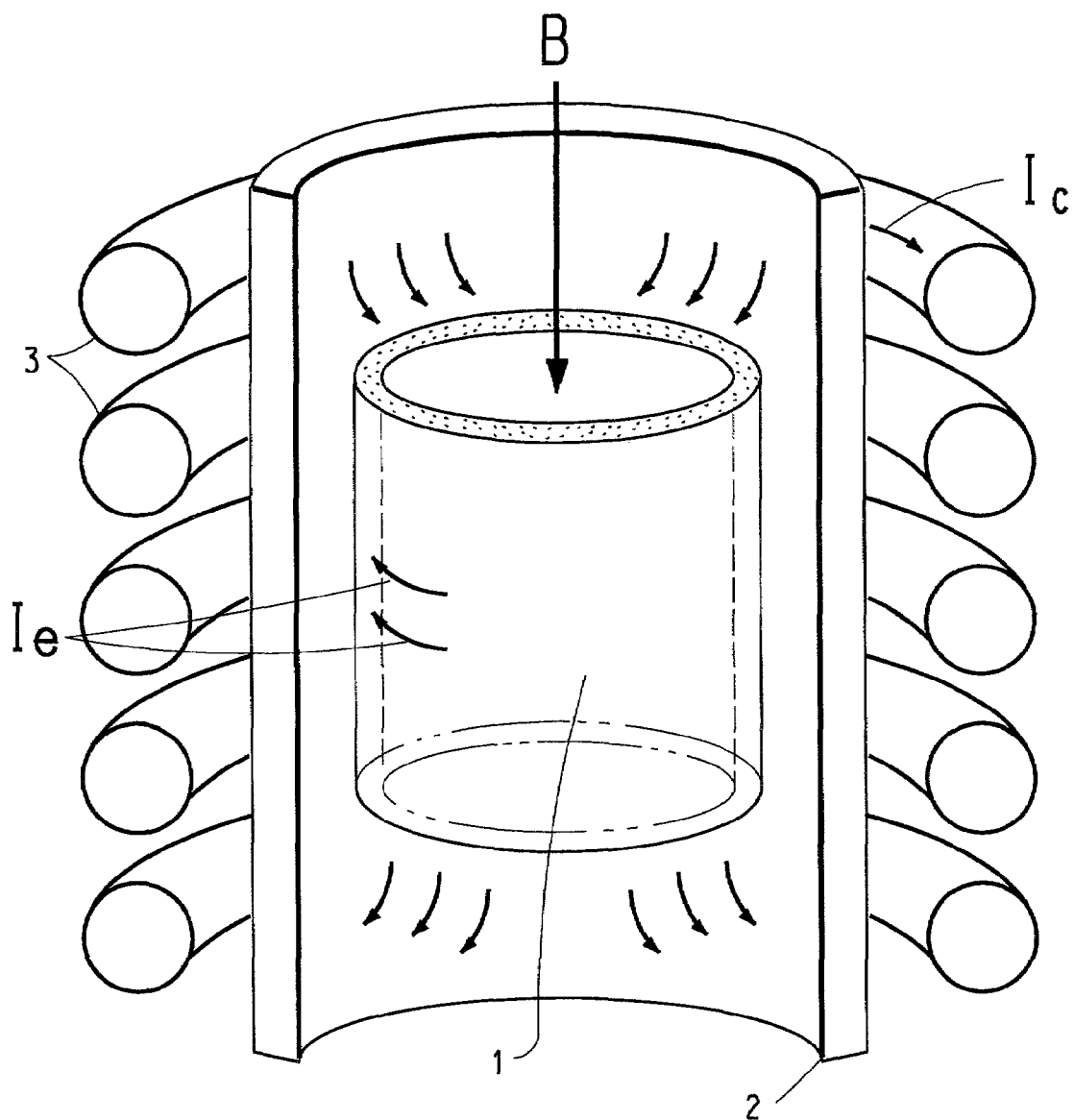
FIG. 1 illustrates the principles underlying the induction heating technique embodied in the present invention, while various specific embodiments of the present invention are illustrated by FIGS. 2 through 8.

In accordance with the present invention, the process and reactor are designed so as to increase the effective length of the conduction path in the platinum group metal object which serves as the catalyst/susceptor. It is also an object of the present invention to exploit this increased effective conduction path length to permit the use of induction heating at the lowest possible induction frequency. It is a further object of this invention to minimize the variation of temperature across the catalyst/susceptor and to minimize the variation in the gas flow across the catalyst/susceptor. It is yet another object of this invention to provide a process and apparatus which require lower capital costs, as well as lower manufacturing costs. Still other objects of this invention are to provide for lower residence times, higher yields of HCN, and reduction in or elimination of by-products, including coke, $N_2$, $H_2O$, CO, and $CO_2$. All of the foregoing objects are realized by this invention.

In the process of the present invention, an alkane containing 1 to 6 carbon atoms is reacted with ammonia over the catalyst/susceptor that is heated by induction heating. Preferably, natural gas high in methane should be used; propane also may be used, particularly in areas where natural gas is not available. The reaction temperature ranges between 950 and 1400 degrees C., preferably between 1000 and 1200 degrees C., and most preferably between 1050 and 1150 degrees C. Such temperatures are provided by induction heating at frequencies generally of 50 Hz to 30 MHz, preferably 50 Hz to 300 kHz, and most preferably 50 Hz to 3 kHz. The HCN production rate is limited by kinetics below 1050 degrees C. and at temperatures below 1,000 degrees C. the hydrocarbon may form coke over the catalyst surface. The reaction rate is higher at higher temperatures; however, the temperature is limited by the softening point of the catalyst/susceptor and the support structure. Moreover, at temperatures above 1200° C., rather than reacting with methane, ammonia can preferentially decompose to nitrogen and hydrogen. Reactor materials, such as alumina or quartz, are selected to withstand the high reaction temperatures and steep thermal gradients.

The present invention utilizes a catalyst/susceptor in the form of a cylinder surrounded by an induction coil. The outer diameter of the catalyst/susceptor is preferably as large as possible. Although the ratio of the outer diameter of the catalyst/susceptor to the inner diameter of the induction coil can be as small as 0.05, this ratio is preferably greater than 0.5, and most preferably as close to 1.0 as practical. The eddy current path within the catalyst/susceptor is thus as long as possible, thereby permitting the use of the lowest possible induction frequency for a given size reactor.

The innermost region of a solid cylindrical catalyst/susceptor is less efficiently induction heated than the outer region. This reduction in heating efficiency is caused by: (1) a shorter current path length in the inner portion of the cylinder and (2) shielding effects of the outer portion of the cylinder. A hollow cylinder shape, having an annular cross-section, is therefore preferred for the catalyst/susceptor. The thickness of the wall of the hollow cylindrical catalyst/susceptor is typically no more than about one-fourth its outer diameter since the inner portion of the wall of the cylinder is induction heated less efficiently. The inner portions of the cylindrical catalyst/susceptor may be optionally comprised of a material having higher electrical conductivity than the outer portions of the cylinder to partially compensate for the reduced induction heating efficiency.

The cylindrical catalyst/susceptor of the present invention addresses the need for the lowest possible induction frequency, high catalytic activity per reactor volume, and high power efficiency. The reactor configurations and the process of the present invention result in improved economics at all production scales, both large and small. So that the lowest possible induction frequency may be used, the eddy current path within the catalyst/susceptor should be as long as possible. Therefore, in accordance with the present invention, a catalyst/susceptor that is large in comparison to the size of the reactor is used. The ratio of the outer dimension of the catalyst/susceptor to the inner dimension of the reactor should be as high as possible.

The structure of the cylindrical catalyst/susceptor of this invention may take several forms. The cylindrical catalyst/susceptor may be comprised of a gas-permeable solid, such as a porous foam, or may be comprised of multiple layers of a gas-permeable filamentary structure. The filamentary structure may be a braided, woven or knitted fabric (e.g., gauze), or bobbin-wound filaments. The multiple gas-permeable layers may be in the form of rings stacked on one another, in the form of concentric cylinders, or they may take the form of multiple catalyst/susceptor layers that are wound around one another. Multiple wound layers should have good inter-layer electrical conductivity for efficient inductive heating to occur. The cylindrical catalyst/susceptor thus has eddy current paths comparable in dimension to the circumference of the reactor.

When placed in an inductive field, the cylindrical catalyst/susceptor is directly heated and its temperature can be readily controlled by controlling the intensity of the inductive field. By controlling the temperature of the catalyst/susceptor a desired chemical reaction may be selectively promoted and the rate of undesirable reactions may be suppressed. The cylindrical catalyst/susceptor comprises a platinum group metal, such as platinum itself or an alloy of platinum, such as platinum/rhodium or platinum/iridium. The temperature of the catalyst/susceptor may be accurately controlled by controlling the intensity of the inductive field and controlling the flow rates of the reactant gases. The formation of HCN may thus be achieved at high yields while avoiding the problems of prior art processes, such as formation of coke on the catalyst, spontaneous decomposition of the ammonia gas, or the formation of undesired products that have to be separated later.

In the chemical process of interest in the present invention, the requirements for power level are intense. A typical medium scale HCN plant with the production rate of 10 million pounds per year would require an induction source with a power level of at least 3.0 megawatts (MW). At this power level, only low frequency systems of 3 kHz or below are economical and commercially available.

DETAILED DESCRIPTION OF THE DRAWINGS

FIG. 1 is a schematic representation which illustrates the principle involved in the present invention. Substantially cylindrical catalyst/susceptor 1 is positioned within a reactor wall 2 which is substantially electrically non-conductive. Said cylindrical catalyst/susceptor 1 is gas-permeable, and has electrical properties (bulk conductivity and continuous conduction paths around the circumference of the cylinder) required to induce eddy currents which can flow in circular paths around and within the annular catalyst/susceptor. An induction coil 3 (typically fluid-cooled) surrounds the catalyst/susceptor 1 and the reactor wall 2. Alternating current $I_c$ in coil 3 induces an alternating magnetic field B which in turn induces an eddy current $I_e$ in the catalyst/susceptor 1 in a plane substantially parallel to alternating current $I_c$. Induced current $I_e$ causes heating; larger eddy currents generating more heat. As the radius of the catalyst/susceptor 1 increases larger eddy currents are generated. As the outer diameter of the catalyst/susceptor annulus 1 approaches the diameter of reactor 2, a lower frequency may be used to effectively heat the catalyst/susceptor annulus.

Figure 2:
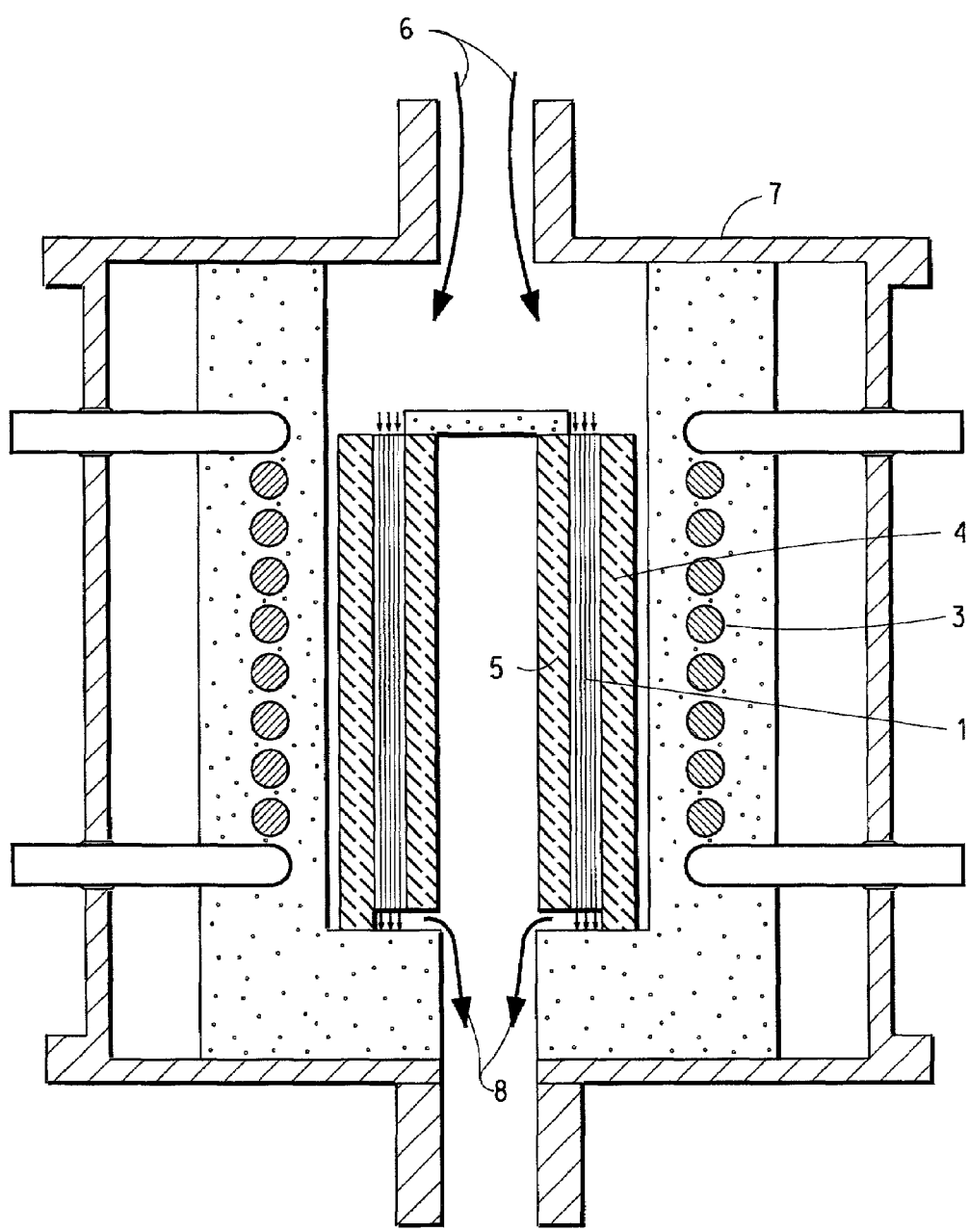
FIG. 2 shows an axial flow reactor wherein the catalyst/susceptor is comprised of layers of a filamentary structure.

In FIG. 2, gas-permeable catalyst/susceptor 1 comprises bobbin-wound wire, knitted wire mesh, woven wire mesh, spirally-wound sock or sleeve, or braided wire. The wire is comprised of platinum group metal or alloy, e.g. platinum or a platinum/rhodium metal alloy. The catalyst/susceptor 1 is positioned between annular gas-impermeable, electrically non-conductive, high temperature resistant cylinders 4 and 5, such as quartz or ceramic. Cylinder 4 is open at both ends, whereas cylinder 5 is closed at the top end. Cylinders 4 and 5 are positioned and cooperate so as to guide reaction gasses 6 so that they can flow through catalyst/susceptor 1. The alternating magnetic field induced by water-cooled induction coil 3 induces an electric current in catalyst/susceptor 1, thereby heating it. Reactants 6 enter the top of containment vessel 7 and pass between cylinders 4 and 5 in an axial direction, thereby contacting hot catalyst/susceptor 1, and the desired reaction takes place. Product gasses 8 comprising HCN and hydrogen exit containment vessel 7. Because walls 4 and 5 are electrically non-conductive, the induction field heats the catalyst/susceptor and not the walls.

Figure 3:
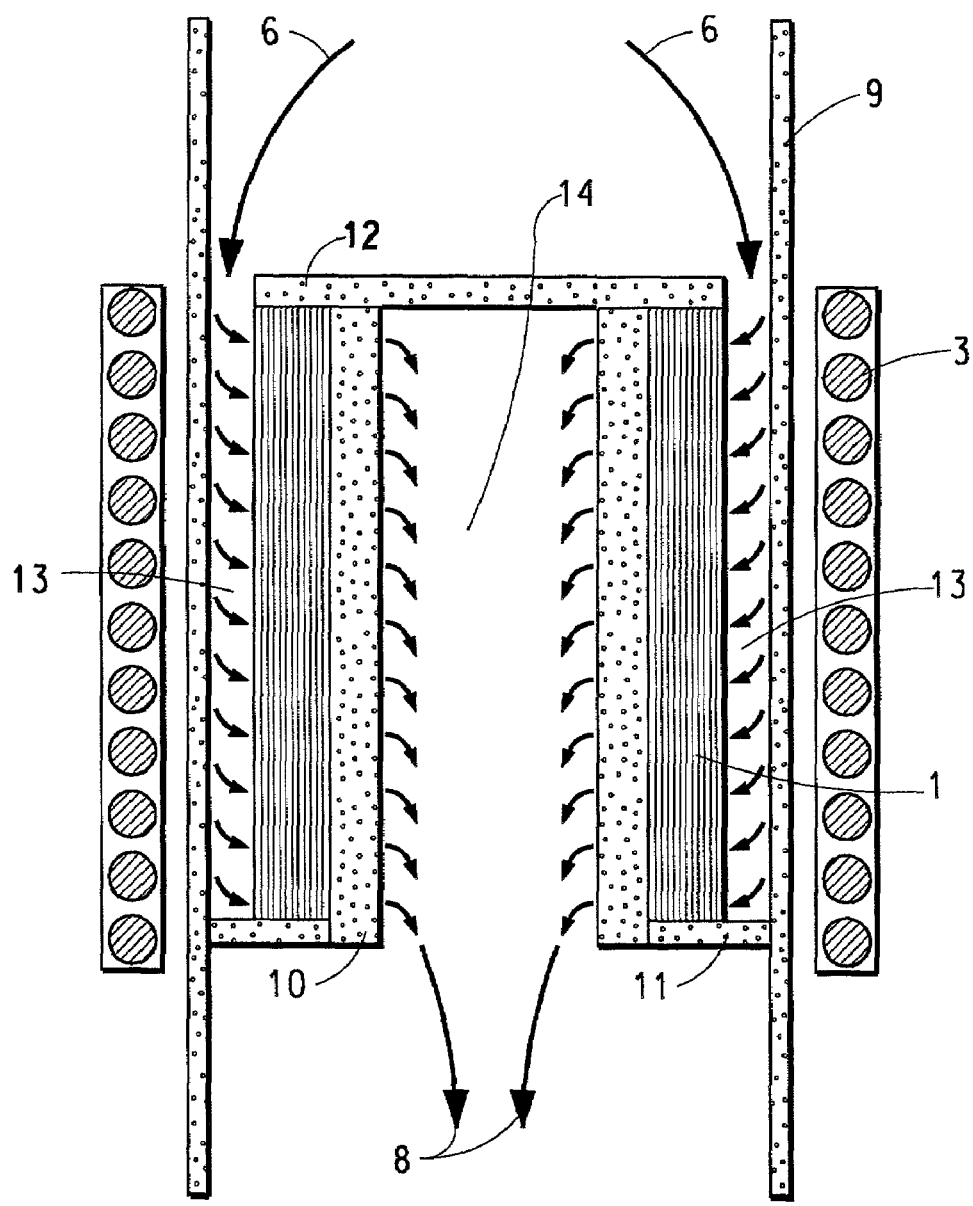
FIG. 3 shows a radial flow reactor wherein the catalyst/susceptor is comprised of layers of a filamentary structure.

FIG. 3 illustrates another embodiment of the invention. Catalyst/susceptor 1 is gas-permeable and comprises bobbin-wound wire, knitted wire mesh, woven wire mesh, spirally-wound sock or sleeve, or braided wire. Catalyst/susceptor 1 is located between gas-impermeable cylinder 9 and gas-permeable cylinder 10. Gas-impermeable cylinder 9 is open at its upper end and connected to a gas-impermeable annular shoulder 11. Cylinder 10 is closed at its top by gas-impermeable lid 12. The outer diameter of catalyst/susceptor 1 is less than the inner diameter of cylinder 9, thereby providing an annular passage 13. Reactants 6 enter passage 13, and pass radially through gas-permeable catalyst/susceptor 1 as it is being induction heated. Thereafter product HCN and hydrogen 8 exit through the gas-permeable wall of cylinder 10 into central passage 14. The properties of the gas-permeable cylinder 10 are selected to insure uniform flow of reactant gasses through the catalyst/susceptor 1.

Figure 4:
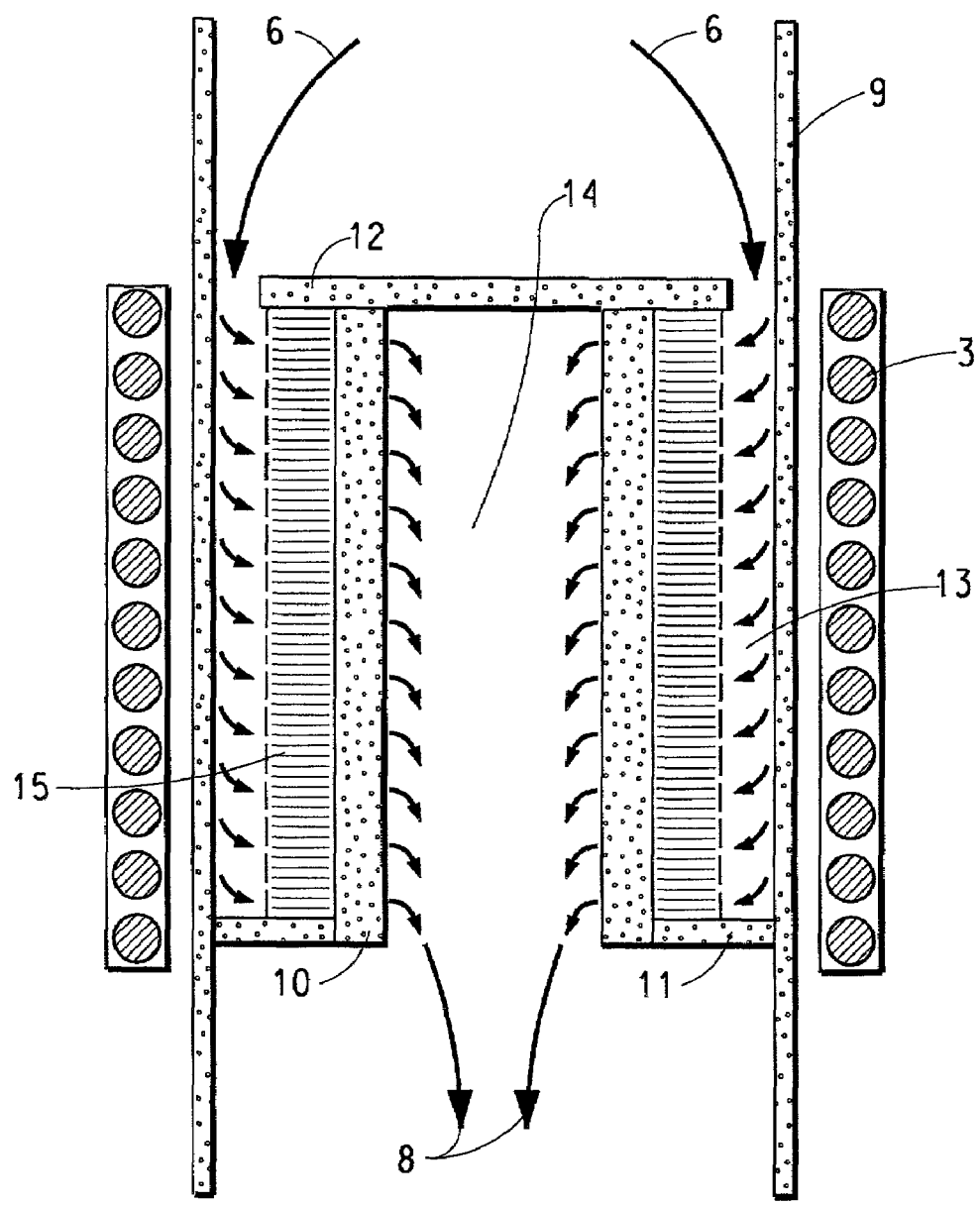
FIG. 4 shows a radial flow reactor wherein the catalyst/susceptor is comprised of a stack of gas-permeable rings.

FIG. 4 shows a reactor similar in arrangement and operation to the reactor of FIG. 3. However in FIG. 4, the catalyst/susceptor 1 comprises gas-permeable rings 15 of catalyst/susceptor material stacked on one another. The rings may be comprised of the types of filamentary structures described above in conjunction with FIGS. 2 and 3.

Figure 5:
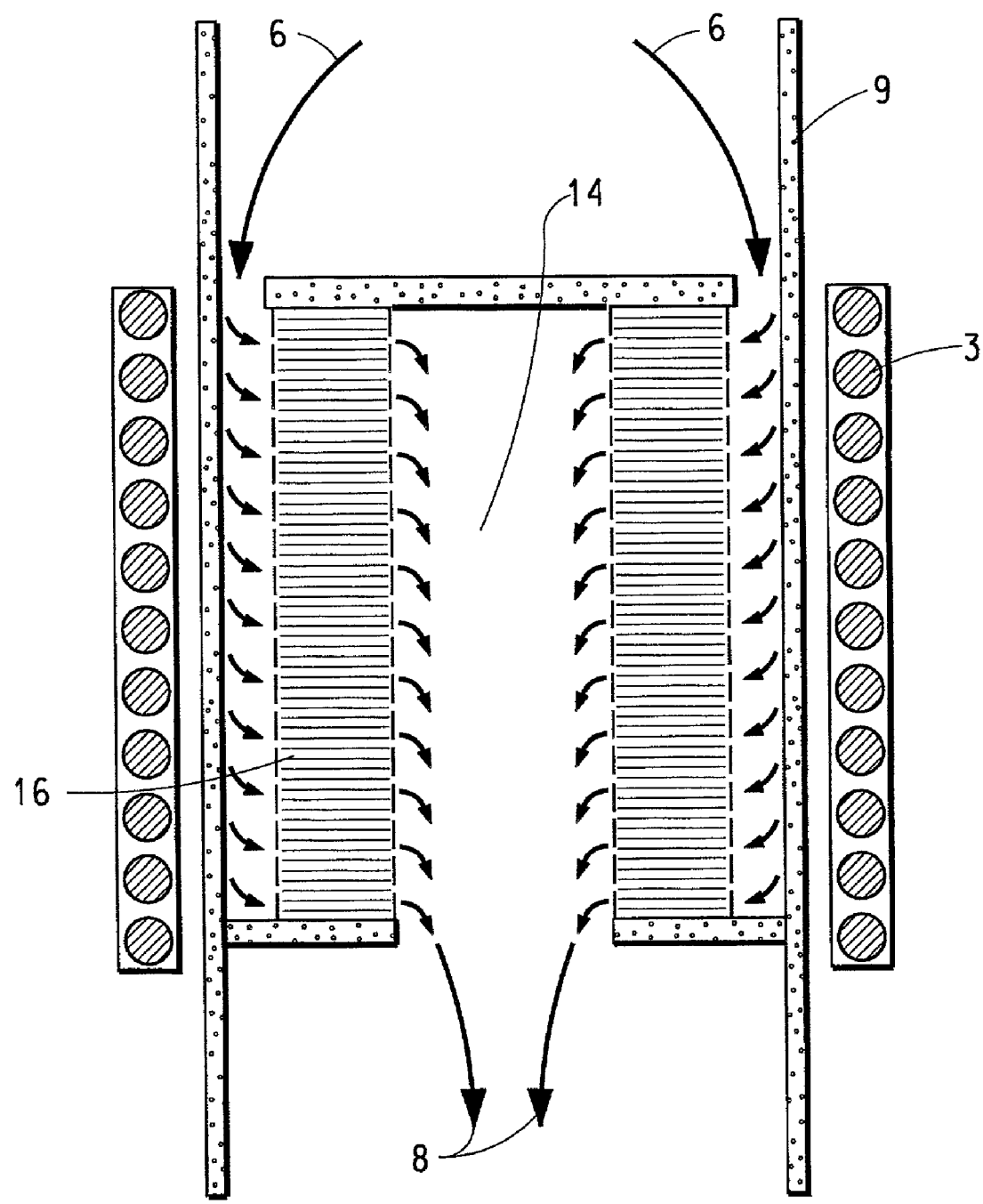
FIG. 5 shows an axial flow reactor wherein the gas-permeable rings are self-supporting.

FIG. 5 shows a reactor similar in arrangement and operation to the reactor of FIG. 4. However in FIG. 5, there is no gas-permeable cylinder 10 since the stacked rings 15 are self-supporting.

Figure 6:
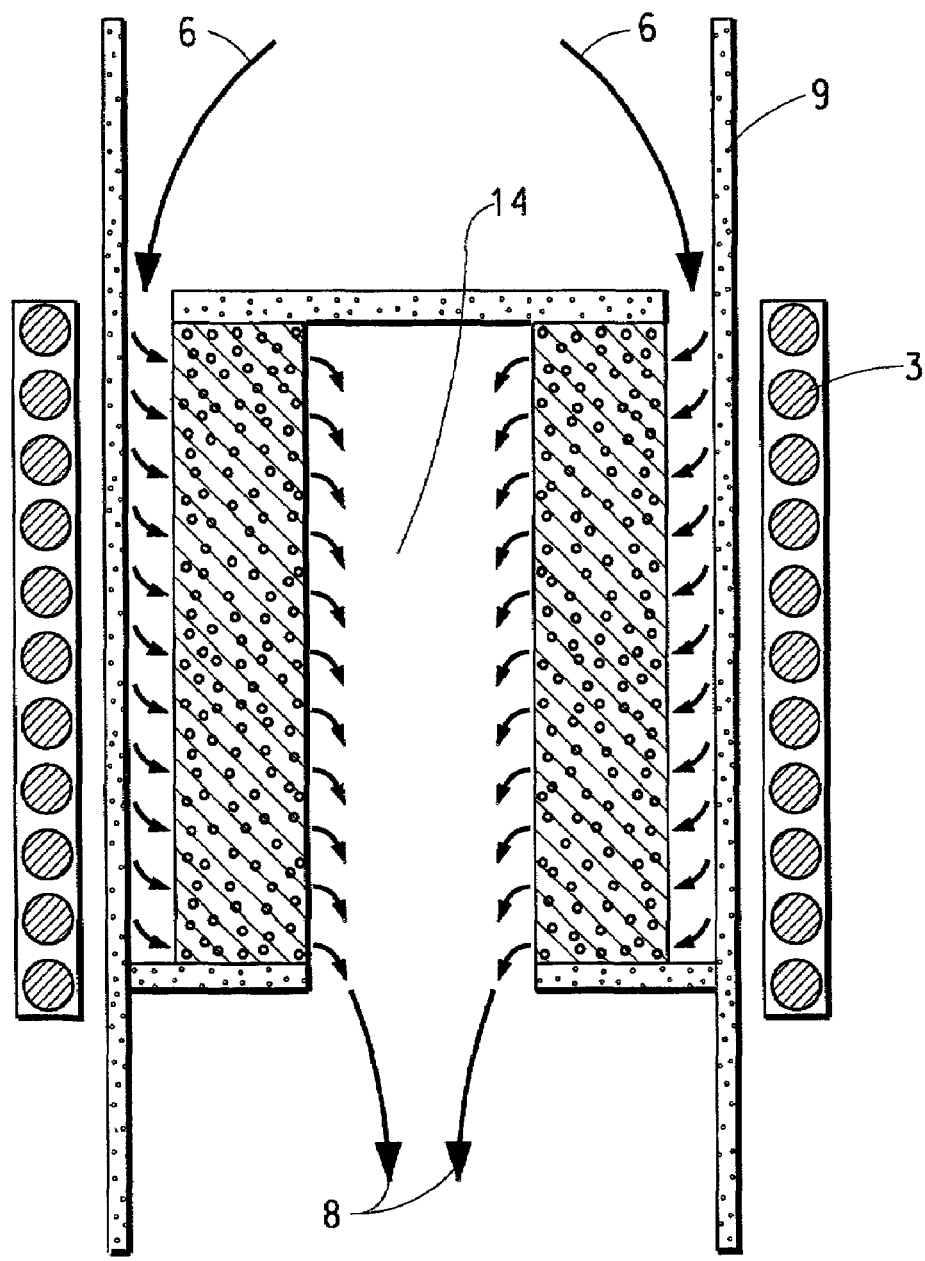
FIG. 6 shows an axial flow reactor wherein the catalyst/susceptor is comprised of a metal foam.

FIG. 6 shows a reactor similar in arrangement and operation to the reactors of FIGS. 3 through 5. However in FIG. 6, the catalyst/susceptor 1 comprises a gas-permeable platinum group metal foam 16.

Figure 7:
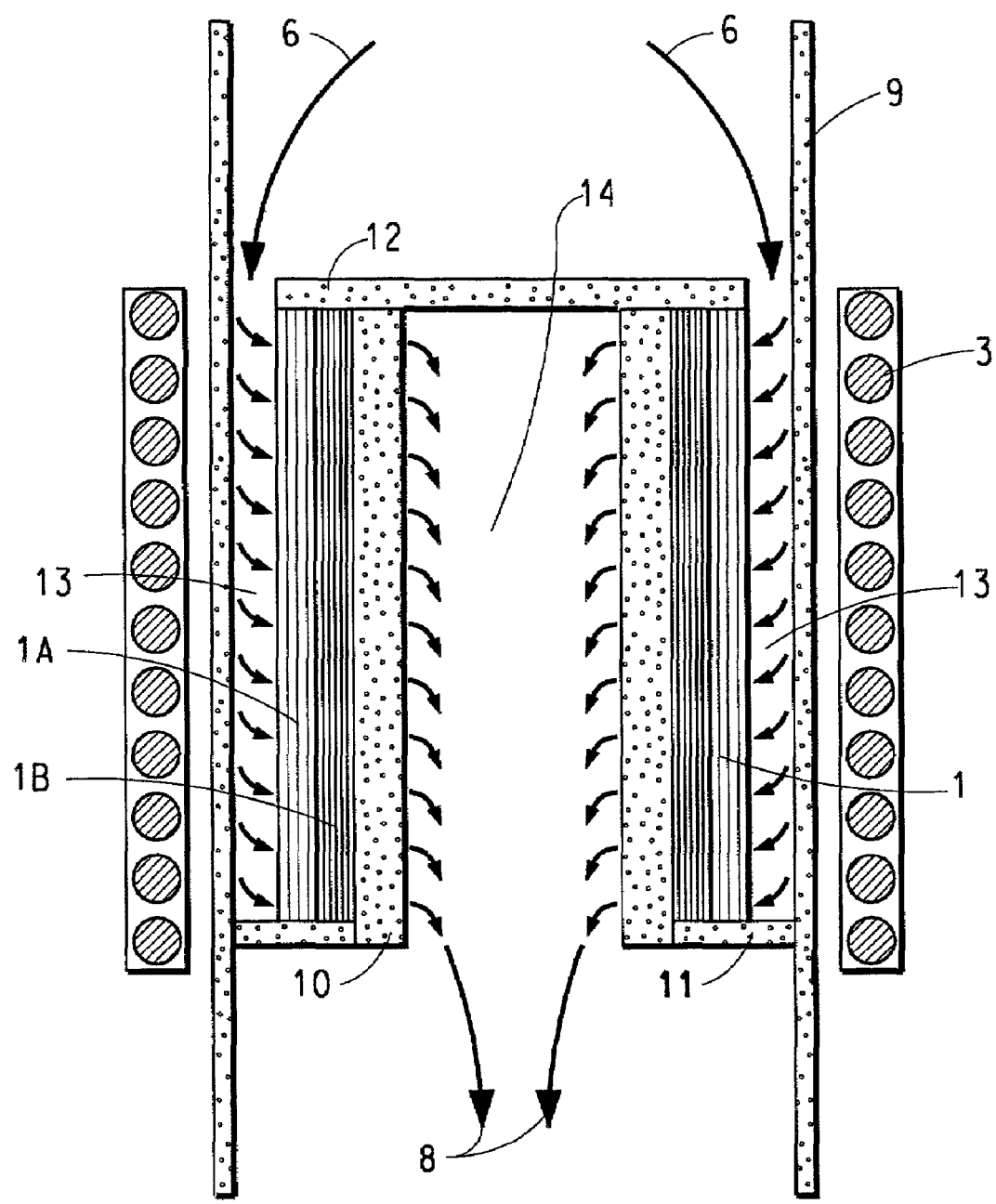
FIG. 7 shows a radial flow arrangement wherein the catalyst/susceptor is comprised of two annular regions each having a different electrical conductivity.

FIG. 7 shows a radial flow reactor similar in arrangement and operation to the reactor of FIG. 3 wherein the catalyst/susceptor is comprised of an outer region 1A and an inner region 1B. The inner region 1B has a higher electrical conductivity than the conductivity of region 1A. In one embodiment this is achieved by making the cylindrical layers of gauze of the inner region 1B of a higher count mesh (i.e., more wires per unit area) than the layers of the outer region 1A. In another embodiment, this is achieved by making the layers of the inner region 1B of a heavier wire gage.

Figure 8A:
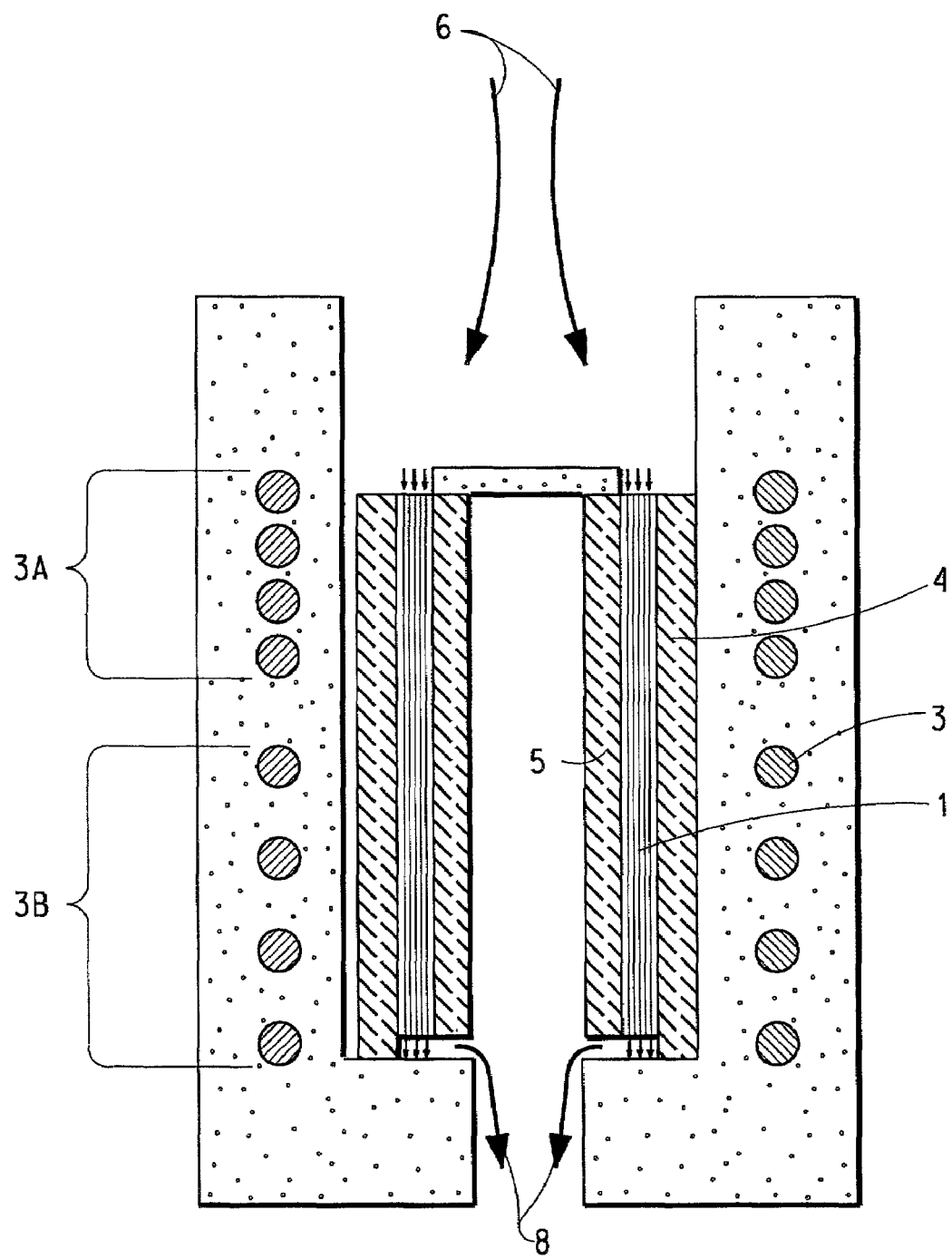
FIG. 8A shows an axial flow arrangement wherein the induction coil is comprised of two sections, each section having a different coil spacing.
Figure 8B:
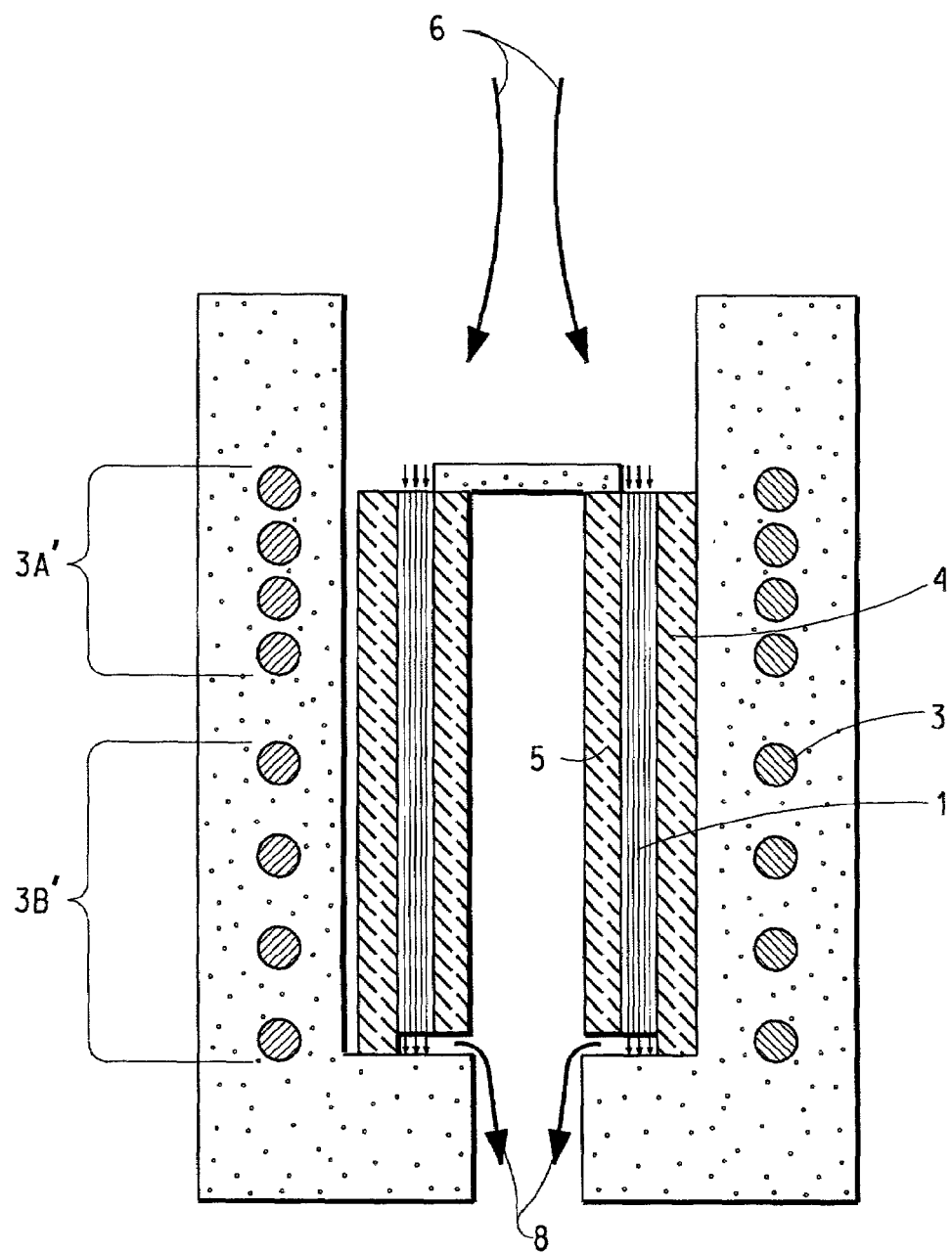
FIG. 8B shows an axial flow arrangement wherein the induction coil is comprised of two separate coils, each coil carrying current of a different magnitude.

FIGS. 8A and 8B show an axial flow reactor similar in arrangement and operation to the reactor of FIG. 2, wherein induction coil 3 has a first region 3A adjacent to the reactor inlet and a second region 3B adjacent to the reactor outlet. These arrangements produce an induction field that delivers a higher heat flux adjacent the reactor inlet so as to compensate for the cooling effect of the reactant gases and thus create a more uniform temperature in the catalyst/susceptor. In a first embodiment, as seen in FIG. 8A, a single induction coil 3 is provided and the turns of the coil in region 3A are spaced closer to each other than are the turns of the coil in region 3B. In a second embodiment, as seen in FIG. 8B, two separate induction coils 3A' and 3B' are provided. Each coil is separately energized, with coil 3A' carrying more current and thus producing more heat in the region of the catalyst/susceptor adjacent the reactor inlet.

In the reactors of FIGS. 2–6, the outermost portions of the catalyst/susceptor, i.e., region 1, 15 and 16, are preferentially induction heated as compared to the inner portions near the central portion of the cylindrical catalyst/susceptor. Successful implementation of a reactor having an induction heated catalyst/susceptor requires that the catalyst at the reactor inlet be hot enough to facilitate catalysis and to minimize coking reactions when contacted by the cool reactant gases. FIGS. 7 and 8 show arrangements which better control the uniformity of the temperature of the catalyst/susceptor by modifying the properties of the catalyst/susceptor (FIG. 7) or the induction coil (FIG. 8).

In the case of the radial flow reactor arrangement of FIGS. 3–7, to further enhance chemical reaction efficiency of the reactor, the interior of the hollow cylinder catalyst/susceptor 1 optionally may be filled with gas-permeable catalyst material, which need not be electrically conductive.

The following Examples serve as further illustrations, but not limitations, of the invention.

EXAMPLE 1

This Example demonstrates that the catalyst/susceptor of the present invention can be heated uniformly and with high efficiency by induction heating at low induction frequency. In a manner similar to that of FIG. 2, a cylindrical catalyst/susceptor was constructed by wrapping a strip of platinum alloy gauze thirty-six (36) times around a quartz tube. The platinum alloy comprised 90% platinum and 10% rhodium. The gauze was of an 80 mesh weave and a width of 40.6 cm (16 inches), and had a wire size of 0.076 mm (0.003 inch). The bulk resistivity of platinum gauze was measured to be $85 \times 10^{-6}$ ohm-cm. Therefore the maximum induction heating efficiency can be obtained at the frequency of 425 Hz, which is among the lowest frequencies used in induction heating industry. The quartz tube had an outer diameter of 30.5 cm (12"). The resulting catalyst/susceptor had an inner radius of 15.24 cm and a thickness of about 0.6 cm. The catalyst/susceptor structure was placed in a water-cooled induction coil, comprised of seventeen (17) turns of 1.9 cm (0.75 inch) diameter copper tubing, the coil having a height of 55.9 cm (22") and an inner diameter of 43 cm. The induction coil was connected to an induction power source, Model VIP Power-Trak, manufactured by Inductotherm Corporation, Rancocas, N.J. (maximum power of 170 kW) operating at a frequency of 3 kHz at a power level of thirty-five kilowatts (35 kW). The induction heating efficiency was approximately 89%. A calculation of the so-called "reference depth" (the distance from the outside surface of the cylinder to a depth where the induced eddy current is reduced to 37% of its surface value) for this example is 2.1 cm, which is substantially larger than the total thickness of 0.6 cm. This Example shows that the induction heating across the thickness of the annulus is substantially uniform. Thus heating at the inner surface of the cylindrical catalyst/susceptor is only 11 percent lower than the heating at the outer surface.

EXAMPLES 2–8

HCN was prepared by reacting a slight molar excess of ammonia with methane in an inductively heated continuous radial flow fixed bed reactor system as illustrated in FIG. 3. The catalyst/susceptor used in this experiment was a single cylinder of 90/10 Pt/Rh wire of diameter 0.003 inch, 80 mesh gauze. The cylinder measured 1.25 inches outside diameter and 1.5 inches high. The cylinder was constructed by wrapping 23 layers of the Pt/Rh gauze around a 1 inch diameter perforated quartz tube (gas-permeable tube 10 of FIG. 3) made up of about forty percent (40%) openings. The total wrapped thickness of the catalyst/susceptor was about 0.12–0.13 inches. The single cylinder of catalyst/susceptor was mounted as a concentric cylinder inside the larger induction coil cylinder. Reactants were fed to the catalyst/susceptor in a radial direction with product gases exiting through the center of the perforated quartz tube. Temperature was controlled by monitoring a single bulk exit gas temperature in the center of the perforated quartz tube and by adjusting the power input to the induction power source to maintain the desired temperature. Induction heating was supplied at a constant frequency of 97 kHz. Reaction conditions, conversions, and yields are shown in Table 1.

TABLE 1

| Example Number | $NH_3$ Feed (sccm) | $CH_4$ Feed (sccm) | Res. Time (sec) | Temp T°(C.) | $CH_4$ % Conversion | $NH_3$ % Conversion | HCN % Yield (on $NH_3$) |
|---|---|---|---|---|---|---|---|
| 2 | 524  | 476  | 0.70 | 1100 | 95 | 96 | 86 |
| 3 | 1048 | 952  | 0.35 | 1100 | 94 | 95 | 84 |
| 4 | 1571 | 1429 | 0.23 | 1100 | 85 | 93 | 74 |
| 5 | 524  | 476  | 0.70 | 1150 | 95 | 97 | 86 |
| 6 | 1048 | 952  | 0.35 | 1150 | 96 | 97 | 86 |
| 7 | 1650 | 1429 | 0.23 | 1150 | 83 | 93 | 69 |
| 8 | 2140 | 1860 | 0.17 | 1150 | 79 | 92 | 66 |

EXAMPLES 9–16

Examples 9–16 illustrate performance of an axial flow arrangement through the single catalyst/susceptor cylinder. HCN was prepared by reacting a slight molar excess of ammonia with methane in an inductively heated continuous flow fixed bed reactor system illustrated in FIG. 2. The catalyst/susceptor used in this experiment was a single cylinder of 90/10 Pt/Rh gauze which measured 0.75 inch OD×0.50 inch ID×1.50 inches high. The catalyst/susceptor was constructed by wrapping 23 layers of Pt/Rh gauze around a 1.3 cm (0.50 inch) diameter solid quartz tube. The cylindrical catalyst/susceptor, having a cross sectional area of 0.245 in², was then inserted inside a 0.75 inch ID quartz reactor tube, forming a snug fit. The reactor tube was then placed inside a slightly larger induction coil cylinder. Reactants were fed to the catalyst in an axial direction with product gases exiting through the annulus formed between the two concentric quartz tubes. Temperature was controlled by monitoring a single bulk temperature in the center of the 0.50 inch quartz tube and by adjusting the power input to the induction generator to maintain the desired temperature. Induction heating was supplied at a constant frequency of 90 KHz. Reaction conditions, conversions, and yields are shown in Table 2.

TABLE 2

| Example Number | $NH_3$ Feed (sccm) | $CH_4$ Feed (sccm) | Res. Time (sec) | Temp T°(C.) | $CH_4$ % Conversion | $NH_3$ % Conversion | HCN % Yield (on $NH_3$) |
|---|---|---|---|---|---|---|---|
| 9  | 1048 | 952  | 0.18 | 1050 | 98 | 91 | 90 |
| 10 | 1571 | 1429 | 0.12 | 1050 | 91 | 91 | 87 |
| 11 | 2095 | 1905 | 0.09 | 1052 | 67 | 81 | 60 |
| 12 | 1048 | 952  | 0.18 | 1100 | 99 | 92 | 91 |
| 13 | 1571 | 1429 | 0.12 | 1100 | 94 | 94 | 88 |
| 14 | 2095 | 1905 | 0.09 | 1102 | 64 | 79 | 54 |
| 15 | 1048 | 952  | 0.18 | 1150 | 99 | 98 | 92 |
| 16 | 2095 | 1905 | 0.09 | 1152 | 65 | 79 | 56 |

EXAMPLES 17–26

HCN was prepared by reacting excess of ammonia with methane in an inductively heated continuous flow fixed-bed reactor, similar to the reactor configuration shown in FIG. 3. The reactor was comprised of an outer quartz cylinder, 5.08 cm in diameter and 60 cm in length with appropriate fittings to connect the feed manifold and product delivery unit (not shown). The outer reactor cylinder enclosed the catalyst/susceptor bed that comprised 20 layers of 40 mesh, 90/10 Pt-Rh gauze, having a thickness of 0.02 cm, wrapped around an 80 pores per inch (ppi) porous alumina foam tube (2.5 cm OD and 7.8 cm long) closed at the top. The reactants, methane and ammonia, entered the reactor from the top, flowed radially through the cylindrical catalyst/susceptor bed. The product stream, comprising HCN, unreacted methane and/or ammonia, and by-product(s), permeated through the porous alumina tube, and exited the reactor through the hollow cylindrical space inside the porous alumina tube. The reactor feed system was designed to allow up to two gas feeds into the reaction zone at a constant flow rate. The gases were metered and monitored using Brooks mass flow controllers. Product identification and quantification were performed by gas chromatography. The catalyst bed was heated with a water-cooled copper induction coil. Induction heating was supplied at a constant frequency of 126 kHz and the forward and reflected powers were adjusted to obtain desired total output. Reaction conditions, conversions, yields, etc. are presented in Table 3.

TABLE 3

| Example Number | $NH_3$ Feed (sccm) | $CH_4$ Feed (sccm) | Res. Time (sec) | Total Power (watts) | $CH_4$ % Conversion | HCN $NH_3$ % Conversion | % Yield (on $NH_3$) |
|---|---|---|---|---|---|---|---|
| 17 | 2200 | 1800 | 0.30 | 1100 | 93.5 | 100.0 | 78.0 |
| 18 | 2200 | 1800 | 0.30 | 1150 | 92.6 | 100.0 | 77.1 |
| 19 | 2200 | 1800 | 0.30 | 1150 | 94.6 | 100.0 | 80.7 |
| 20 | 2200 | 1800 | 0.30 | 1150 | 94.1 | 100.0 | 80.5 |
| 21 | 3400 | 2800 | 0.19 | 1225 | 90.9 | 100.0 | 86.9 |
| 22 | 3400 | 2800 | 0.19 | 1225 | 91.7 | 100.0 | 86.1 |
| 23 | 3400 | 2800 | 0.19 | 1225 | 91.7 | 100.0 | 85.3 |
| 24 | 4400 | 3600 | 0.15 | 1400 | 90.6 | 100.0 | 84.9 |
| 25 | 4400 | 3600 | 0.15 | 1400 | 88.7 | 100.0 | 84.7 |
| 26 | 4400 | 3600 | 0.15 | 1400 | 85.1 | 100.0 | 83.2 |

EXAMPLES 27–32

HCN was prepared by reacting a slight molar excess of ammonia with methane in an inductively heated, continuous flow, fixed-bed reactor. The reactor consisted of an outer quartz cylinder, enclosing the catalyst/susceptor bed. The catalyst/susceptor bed, comprised six platinum foam disks, each 0.3 cm thick, 2.54 cm in diameter and having a 40 ppi porosity, were placed one on top of the other in a concentric cylindrical catalyst holder. The reactants, methane and ammonia, were metered and monitored with Brooks mass flow controllers and introduced in to the reactor from the top at flow rates as shown in Table 4. The gases then flowed downward through the cylindrical catalyst/susceptor bed which was heated by induction heating, and the product stream comprising HCN, unreacted methane and/or ammonia, hydrogen, and other by-product(s) left the reaction zone at the bottom of the quartz reactor. The catalyst bed was induction heated at a constant frequency of 142 kHz. The forward and reflected powers were adjusted to obtain desired total output. Reaction conditions, conversions, yields, etc. are presented in Table 4.

TABLE 4

| Example Number | $NH_3$ Feed (sccm) | $CH_4$ Feed (sccm) | Res. Time (sec) | Total Power (watts) | $CH_4$ % Conversion | $NH_3$ % Conversion | HCN % Yield (on $NH_3$) |
|---|---|---|---|---|---|---|---|
| 27 | 2200 | 1750 | 0.138 | 1100 | 85.5 | 93.2 | 78.2 |
| 28 | 2200 | 1750 | 0.138 | 1200 | 90.1 | 94.2 | 79.1 |
| 29 | 2200 | 1750 | 0.138 | 1300 | 93.8 | 98.6 | 81.9 |
| 30 | 2200 | 1750 | 0.138 | 1400 | 98.2 | 100.0 | 83.5 |
| 31 | 2200 | 1850 | 0.135 | 1450 | 93.5 | 98.9 | 81.1 |
| 32 | 2200 | 2000 | 0.130 | 1500 | 95.1 | 100.0 | 85.9 |

What is claimed is:

1. An apparatus for conducting elevated temperature, gas phase, catalyzed chemical reactions for the preparation of HCN comprising:

a reaction chamber defining a hollow cylinder comprised of a substantially gas-impermeable electrically non-conductive material, a catalyst/susceptor defining an electrically conductive and gas-permeable hollow cylinder positioned coaxially within said reaction chamber and comprised of one or more platinum group metals in a form selected from porous foam, or a filamentary structure comprising one or more of braided wire mesh, woven wire mesh, knitted wire fabric, bobbin-wound wire filaments or spirally-wound sock or sleeve, and an induction coil surrounding said catalyst/susceptor and energizable by a power source capable of supplying alternating current, whereby said catalyst/susceptor is heated by induction from an alternating magnetic field to a temperature sufficient to effect the chemical reaction.

2. The apparatus of claim 1 wherein said induction coil is comprised of two or more discreet sections in which each of said section is energizable by a separate power source.

3. The apparatus of claim 1 wherein said induction coil is comprised of two or more sections in which the spacing of the coils in one of said sections differs from the spacing of the coils in each of the other one or more sections.

4. The apparatus of claim 1 wherein said catalyst/susceptor is comprised of concentric annular layers having different bulk electrical conductivities.

* * * * *